(12) United States Patent
Lee

(10) Patent No.: US 7,381,335 B2
(45) Date of Patent: Jun. 3, 2008

(54) METHOD AND ARRANGEMENT FOR CONTINUOUS FILTERING OF PARTICLES OUT OF A LIQUID

(75) Inventor: Hyosong M. Lee, Malmyägen 20, Tumba, SE.-147 (SE)

(73) Assignee: Hyosong M. Lee, Malmydge (SE)

( * ) Notice: Subject to any disclaimer, the term of this patent is extended or adjusted under 35 U.S.C. 154(b) by 381 days.

(21) Appl. No.: 10/555,292

(22) PCT Filed: Apr. 13, 2004

(86) PCT No.: PCT/SE2004/000575

§ 371 (c)(1),
(2), (4) Date: Nov. 21, 2005

(87) PCT Pub. No.: WO2004/103524

PCT Pub. Date: Dec. 2, 2004

(65) Prior Publication Data

US 2006/0213826 A1 Sep. 28, 2006

(30) Foreign Application Priority Data

May 23, 2003 (SE) .................................... 0301517

(51) Int. Cl.
*B01D 37/04* (2006.01)
*B01D 35/12* (2006.01)
*B01D 33/37* (2006.01)

(52) U.S. Cl. ...................... 210/741; 210/784; 210/791; 210/97; 210/103; 210/106; 210/107; 210/330; 210/331; 210/332; 210/340; 210/341; 210/396; 210/402; 210/416.1; 210/526

(58) Field of Classification Search .................... None
See application file for complete search history.

(56) References Cited

U.S. PATENT DOCUMENTS 1,748,081 A * 2/1930 Reed et al. .................. 210/142

(Continued)

FOREIGN PATENT DOCUMENTS

GB 2 066 688 A 1/1980

(Continued)

*Primary Examiner*—Robert James Popovics
(74) *Attorney, Agent, or Firm*—Robert D. Katz; Cooper & Dunham LLP

(57) ABSTRACT

Method and arrangement for continuous filtering of particles out of a contaminated liquid by means of a number of separate filtering units (14) in order continuously to feed purified liquid to a consumer. Each filtering unit (14) comprises a rotatable, perforated drum (16) with a particle-catching filter means (18) on the outer surface of the drum. A first predetermined degree of coating with particles is created on the filter means of the drums, and purified liquid inside all the drums of the filtering units (14) except at least one, which is kept inactive in a standby state by shutting off the associated pump (26), is then fed to a consumer. The feed of purified liquid from a drum to the consumer is interrupted when a second predetermined, higher degree of coating with particles has been reached on the filter means on an individual drum, at least one filtering unit kept in standby state being activated as replacement for the filtering unit(s) from which the feed of purified liquid has been interrupted. The filter means of each filtering unit shut down is cleaned, and liquid in the tank is made to pass through the cleaned filter means and to circulate back to the tank until the first predetermined degree of coating with particles has been reached on the filter means of the drum. The cleaned shut-down filtering unit is put in a standby state by shutting off its pump. The second, higher degree of coating is detected by means of a respective pressure sensor coordinated with each filtrate outlet pipe (24).

13 Claims, 1 Drawing Sheet

U.S. PATENT DOCUMENTS

| | | | | |
|---|---|---|---|---|
| 2,568,085 A | * | 9/1951 | Naugle | 210/333.01 |
| 2,576,288 A | * | 11/1951 | Bench et al. | 210/739 |
| 2,851,161 A | * | 9/1958 | Dahlstrom et al. | 210/741 |
| 3,245,536 A | * | 4/1966 | McKay | 210/784 |
| 3,347,379 A | * | 10/1967 | Miller, Jr. | 210/127 |
| 3,929,639 A | * | 12/1975 | Turner et al. | 210/774 |
| 3,979,289 A | * | 9/1976 | Bykowski et al. | 210/784 |
| 4,140,629 A | * | 2/1979 | Martindale | 209/240 |
| 4,198,299 A | * | 4/1980 | Ewing et al. | 210/784 |
| 4,218,322 A | * | 8/1980 | Kojima | 210/391 |
| 4,224,166 A | * | 9/1980 | Wyman | 210/396 |
| 4,287,063 A | * | 9/1981 | Stenzel | 210/402 |
| 4,421,645 A | * | 12/1983 | Creps et al. | 210/260 |
| RE32,135 E | * | 5/1986 | Creps et al. | 210/260 |
| 4,618,431 A | * | 10/1986 | Hindman et al. | 210/741 |
| 4,655,940 A | * | 4/1987 | Harms | 210/805 |
| 4,673,496 A | * | 6/1987 | Turner, Jr. | 210/232 |
| 4,702,845 A | * | 10/1987 | Wykoff | 210/784 |
| 4,715,964 A | * | 12/1987 | Harms | 210/283 |
| 4,735,730 A | * | 4/1988 | Bratten | 210/741 |
| 4,895,647 A | * | 1/1990 | Uchiyama | 210/171 |
| 4,992,167 A | * | 2/1991 | Uchiyama | 210/171 |
| 5,030,346 A | * | 7/1991 | McEwen | 210/258 |
| 5,073,260 A | * | 12/1991 | Wilkendorf | 210/238 |
| 5,135,364 A | * | 8/1992 | McEwen | 417/360 |
| 5,167,839 A | * | 12/1992 | Widmer et al. | 210/784 |
| 5,230,793 A | * | 7/1993 | Lenhart et al. | 210/167.31 |
| 5,266,168 A | * | 11/1993 | Suica | 162/314 |
| 5,300,225 A | * | 4/1994 | Fischer | 210/391 |
| 5,403,481 A | * | 4/1995 | Kupka | 210/323.2 |
| 5,407,587 A | * | 4/1995 | Westerberg | 210/784 |
| 5,417,849 A | * | 5/1995 | McEwen et al. | 210/109 |
| 5,464,542 A | * | 11/1995 | Grienberger et al. | 210/784 |
| 5,582,740 A | * | 12/1996 | McEwen et al. | 210/744 |
| 5,603,846 A | * | 2/1997 | Uchiyama et al. | 210/784 |
| 5,670,038 A | | 9/1997 | McKinney | |
| 5,685,984 A | * | 11/1997 | Smith | 210/402 |
| 5,871,643 A | * | 2/1999 | Ota | 210/238 |
| 6,059,963 A | * | 5/2000 | Horakova et al. | 210/143 |
| 6,136,202 A | * | 10/2000 | Foreman | 210/741 |
| 6,241,879 B1 | * | 6/2001 | Kato et al. | 210/106 |
| 6,258,267 B1 | * | 7/2001 | Ota | 210/238 |
| 6,270,669 B1 | * | 8/2001 | Bauer | 210/237 |
| 6,358,406 B1 | * | 3/2002 | Hirs | 210/90 |
| 6,419,842 B1 | * | 7/2002 | Kupka | 210/780 |
| 6,500,344 B1 | * | 12/2002 | Lee et al. | 210/744 |
| 6,508,944 B1 | * | 1/2003 | Bratten | 210/805 |
| 6,517,722 B1 | * | 2/2003 | Benenson et al. | 210/323.2 |
| 6,571,959 B1 | * | 6/2003 | Moore et al. | 210/394 |
| 6,666,976 B2 | * | 12/2003 | Benenson et al. | 210/784 |
| 6,712,981 B2 | * | 3/2004 | Benenson et al. | 210/785 |
| 6,800,197 B1 | * | 10/2004 | Kosola et al. | 210/193 |
| 6,861,004 B2 | * | 3/2005 | Benenson et al. | 210/785 |
| 6,890,443 B2 | * | 5/2005 | Adams | 210/695 |
| 7,001,515 B2 | * | 2/2006 | Sawhill et al. | 210/255 |
| 7,037,437 B2 | * | 5/2006 | Sawhill et al. | 210/784 |
| 7,083,735 B2 | * | 8/2006 | Laing | 210/791 |
| 7,172,689 B2 | * | 2/2007 | Bratten | 210/137 |
| 2002/0000411 A1 | * | 1/2002 | Rockwell | 210/693 |
| 2003/0010705 A1 | * | 1/2003 | Lenhart | 210/402 |
| 2004/0251214 A1 | * | 12/2004 | Adams | 210/748 |
| 2005/0045568 A1 | * | 3/2005 | Laing | 210/791 |
| 2005/0077254 A1 | * | 4/2005 | Sawhill et al. | 210/784 |
| 2006/0213826 A1 | * | 9/2006 | Lee | 210/402 |
| 2006/0231478 A1 | * | 10/2006 | Harms et al. | 210/402 |
| 2007/0241046 A1 | * | 10/2007 | Maupin et al. | 210/402 |

FOREIGN PATENT DOCUMENTS

| | | |
|---|---|---|
| GB | 2 066 688 A | 1/1981 |
| WO | WO 00/66246 | 11/2000 |
| WO | WO 04/000575 | 12/2004 |
| WO | WO 04/103524 A1 | 12/2004 |

* cited by examiner

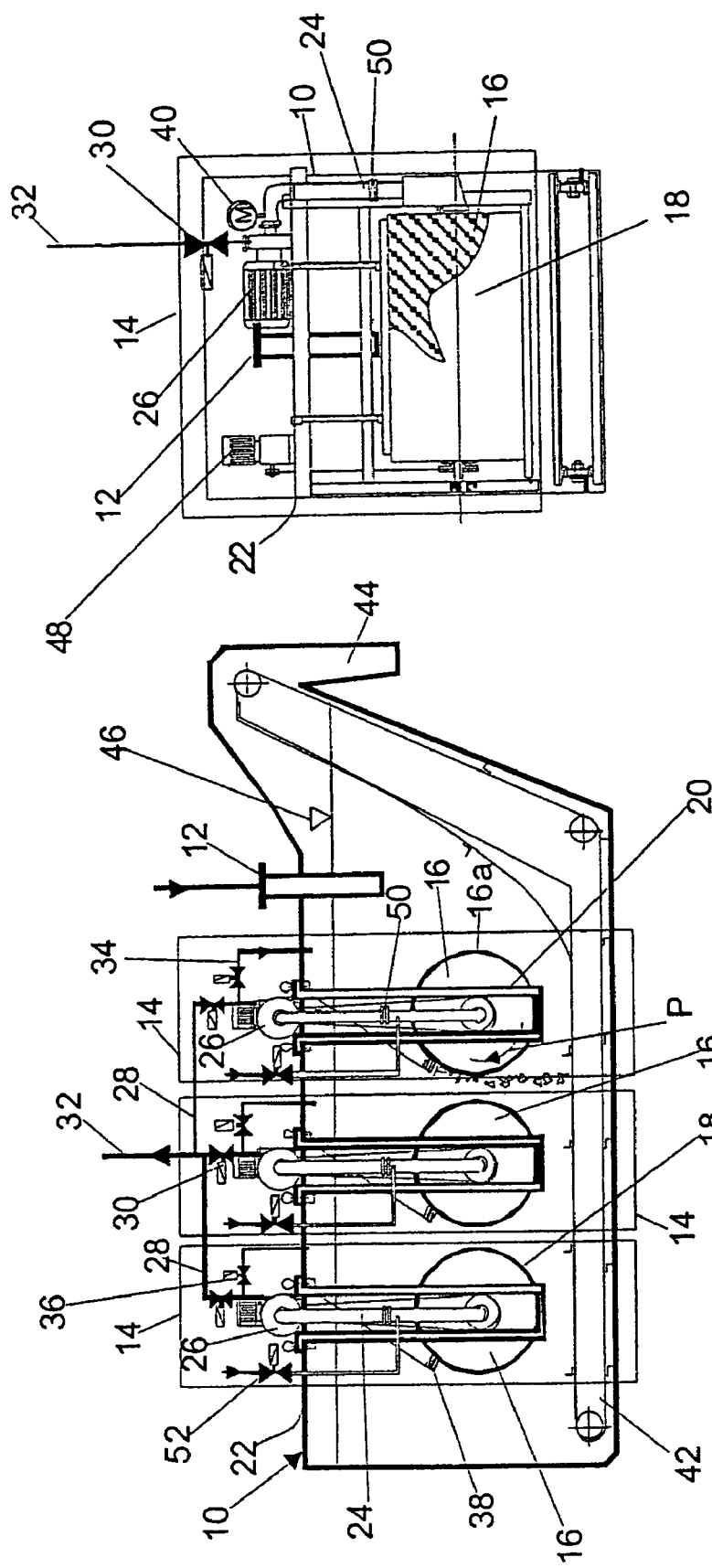

METHOD AND ARRANGEMENT FOR CONTINUOUS FILTERING OF PARTICLES OUT OF A LIQUID

TECHNICAL FIELD

The present invention relates to a method for continuous filtering of particles out of a contaminated liquid by means of two or more separate filtering units in order continuously to feed purified liquid to a consumer, where each filtering unit comprises a rotatable, perforated drum with a particle-catching filter means on the outer surface of the drum, which method comprises the steps of holding the filtering units immersed in a tank of liquid to be purified so that the latter can flow through the filter means and into the drum with the aid of hydrostatic pressure, particles to be separated becoming caught on the filter means and in a coating layer built up thereon by particles caught previously, and of purified liquid being fed from the drum to the consumer via a respective pump and an associated filtrate outlet.

BACKGROUND OF THE INVENTION

It is previously known when certain process liquids are filtered to filter particles which are smaller than the filter meshes of a filter element by first building up a layer of particles on the filter surface which are larger than the filter meshes and in this way creating a three-dimensional deep filter layer of particles on the filter surface which itself functions as a filter for smaller particles which would otherwise pass through the filter element. Such "coating filters" are therefore suitable for liquid suspensions containing very small particles which can be caught therein.

Conventional coating filters can be built up on a filter element and consist of a suspension containing an aid addition of, for example, cellulose powder to the process liquid to be purified by filtering. This suspension is filtered through the filter element first in order to build up a coating layer on it, after which the process liquid itself can be filtered through the coating. When the coating layer has become saturated (clogged) with particles and the filtrate flow has decreased to too low a level, filtering is interrupted and the filter is cleaned. This leads to a marked reduction in production. This method also requires consumption of filter aid and gives rise to a large quantity of costly waste, which results in heavy system investments and high operating costs.

SE 514 311 C2 describes a method of the kind referred to in the introduction, in which a coating layer of particles originating from the process liquid itself is built up on the outside of a filter element on a perforated drum. A number of filtering units of this kind can work in parallel in a common tank in order to bring about high filtering production, that is to say a large filtrate flow. When the filtrate flow from the filtering units has decreased to a minimum value, which has resulted in a rise in level of the suspension in the tank which is sensed by a liquid level monitor common to the filtering units, filtering is interrupted in all the filtering units for the purpose of cleaning the filter elements by slow rotation of the drums against a scraping device on the outside of the filter elements or simply by rapid rotation of the drum. The result is an intermittent operating procedure and thus a reduction in production when the filter units are to be cleaned.

THE OBJECTS AND SOLUTION OF THE INVENTION

It is an object of the present invention to propose a method which eliminates the abovementioned disadvantages of the known filtering methods and which makes possible a controlled build-up of the coating layer on the filter element and cleaning thereof and also an essentially continuous feed of purified liquid to a consumer by virtue of a system of individually controlled filtering units which can work alternately with one another during the filtering process and when filter cleaning takes place. To this end, the method according to the invention referred to in the introduction is characterized by the steps: liquid which has passed through the filter means on the drum is made to circulate back to the tank until a first predetermined degree of coating with particles has been reached on the filter means of the drums, purified liquid inside all the drums of the filtering units except at least one, which is kept inactive in a standby state by shutting off the associated pump, is then fed to a consumer of purified liquid, the feed of purified liquid from a drum to the consumer is interrupted when a second predetermined, higher degree of coating with particles has been reached on the filter means on the drum, at least one filtering unit kept in standby state is activated as replacement for the filtering unit(s) from which the feed of purified liquid has been interrupted by means of its pump being started up and its filtrate outlet being kept open, the filter means of each filtering unit shut down is cleaned, liquid in the tank is made to pass through the cleaned filter means on the drum of the shut-down filtering unit and to circulate back to the tank until the first predetermined degree of coating with particles has been reached on the filter means of the drum, and the cleaned shut-down filtering unit is put in a standby state by shutting off its pump.

Further features of the method according to the invention are indicated in the subsequent dependent patent claims 2-5.

It is also an object of the present invention to propose an arrangement for continuous filtering of particles out of a contaminated liquid in a tank in order continuously to feed purified liquid to a consumer, which arrangement comprises two or a number of separate filtering units which can be immersed completely in the liquid, where each filtering unit comprises a rotatable, perforated drum with a particle-catching filter means on the outer surface of the drum, an outlet of the drum for feeding purified liquid to the consumer, a means for detecting when a predetermined high degree of coating with particles on the filter means has been reached, and a device coordinated with each drum for cleaning the filter means on the drum when the predetermined high degree of coating with particles on the filter means has been reached. According to the invention, such an arrangement is characterized in that there are connected to the outlet of each drum on the one hand a pump for feeding purified liquid from the drum to the consumer and on the other hand a return line, equipped with a valve, to the tank for returning liquid from the drum to the tank by means of the pump while the predetermined low degree of coating with particles on the filter means is built up before the pump is driven only for feeding the purified liquid to the consumer, the means for detecting when the predetermined high degree of coating with particles on the filter means has been reached consisting of a pressure sensor which individually senses the pressure of the liquid on the downstream side of the filter means of each filtering unit.

Other features of the arrangement according to the invention are indicated in the dependent patent claims 7-10.

The invention is described in greater detail below with reference to the accompanying drawing.

BRIEF DESCRIPTION OF THE DRAWING

FIG. 1 is a diagrammatic side view of a filtering installation comprising three filtering units immersed in a suspension tank, and FIG. 2 is an end view of the installation in FIG. 1.

DETAILED DESCRIPTION OF A PREFERRED EMBODIMENT OF THE INVENTION

The filtering installation shown in FIGS. 1 and 2 comprises a tank 10 to which a process liquid to be purified of both larger and fine particles, for example a cutting fluid suspension fed from cutting machines, is supplied continuously via an inlet 12. Suspended in the tank 10 are at least two, but preferably a number of, separate filtering units 14. In the example shown, three such units 14 are immersed in the contaminated suspension liquid in the tank 10. Each filtering unit 14 comprises a drum 16, on the perforated peripheral surface 16a of which a filter means 18 in the form of, for example, a filter cloth is mounted. The drum 16 is mounted rotatably in a stand 20 which is suspended from an upper part 22 of the tank 10.

From the hub of each drum 16, a filtrate outlet pipe 24 leads up to an associated filtrate pump 26 mounted on the upper part 22 of the tank. As can be seen from FIGS. 1 and 2, an outlet line 28 with an inlet valve 30 which can be shut off is connected to each pump 26, the outlet lines 28 being interconnected to form a common inlet line 32 to a consumer of the purified liquid. Connected to the upstream side of the inlet valve 30 is furthermore a return line 34 for returning filtrate liquid to the tank 10 during a stage for building up a predetermined coating layer on the filter element 18 mounted on the drum 16 before the filtering process can be commenced in the filtering unit 14. The coating layer consists of particles from the suspension being purified, which are accumulated on the outside of the filter element 18. The return line 34 has a shut-off valve 36 which is kept open during the stage for building up the coating layer on the drum 16 at the same time as the inlet valve 30 in the outlet line 28 is kept closed. When the filtering units 14 are working actively, their shut-off valves 36 are kept closed, while the inlet valves 30 are open.

Each filtering unit 14 also comprises a filter-cleaning device in the form of, for example, an elongate scraping brush 38 which, during the filtering process, bears in a preloaded manner against the periphery of the stationary drum 16. A pressure sensor 40 coordinated with each individual filtrate outlet pipe 24 senses when the pressure in the outlet pipe 24 has fallen to a predetermined minimum value, in other words when the filter element 18 on the drum 16 concerned has become too clogged to function satisfactorily. When this occurs, the inlet and shut-off valves 30 and 36 for the unit 14 concerned are shut off and cleaning of the filter 18 of the drum is started by the drum 16 being set in rotation about its centre axis in a clockwise direction in FIG. 1, as indicated by the arrow P in the right-hand filtering unit 14, the scraping brush 38 scraping off the filter cake built up on the drum filter. The scraped-off particle sludge falls down and is collected on an underlying endless scraping conveyor 42 which transports the sludge out of the tank 10 via a sludge outlet 44 located above the liquid surface 46 in the tank 10. Alternatively, cleaning of the drum filter 18 can be effected by setting the drum 16 in rapid rotation by means of a motor 48 so that the particle accumulation built up is thrown off by the centrifugal force. Cleaning of the filter element 18 can be completed with brief backwashing of the same by allowing filtrate in the outlet pipe 24 and the outlet line 28 to run back to and through the drum 16 with the inlet valve 30 open and the pump 26 and shut-off valve 36 shut off.

The filtering installation according to the invention is intended to work in the following way:

A number of filtering units 14 of the kind described above, in the example shown only three, are held immersed in a tank 10 or collecting reservoir for the liquid or suspension containing particles which is to be purified by filtering. The outlet lines 28 of the filtering units 14 for purified liquid, the filtrate, are interconnected to form the common inlet line 32 for feeding purified liquid to a consumer, for example a number of machine tools which utilize cutting fluid during operation. Initially, the pumps 26 of the units 14 are started up, the respective inlet valves 30 being kept closed and the shut-off valves 36 open. In this connection, the liquid in the tank 10 flows through the filter element 18 on the drums 16 and via the outlet pipe 24 and the return line 34 back to the tank 10. This phase continues until a first predetermined, lower degree of coating with particles has been reached on the outside of the filter elements 18. This can be established when the respective pressure sensor 40 senses that a given pressure reduction has occurred in the outlet pipe 24. The particle coating formed on the filter surface creates a three-dimensional deep filter layer of particles on the filter surface which itself functions as a filter for smaller particles which would otherwise pass through the filter element 18. The filtering units 14 are then ready to be put into operation. In this connection, all the units 14 are activated except at least one, which is utilized as a standby unit to be activated when one or more of the other units 14 are shut off for cleaning of clogged filter elements 18. When the filtering units 14 are activated, the respective filtrate pumps 26 are started, the outlet valve 30 being kept open and the shut-off valve 36 in the return line 34 closed. Each unit 14 in standby state has its pump 26 and inlet and shut-off valves 30, 36 closed.

When the pressure sensor 40 of a filtering unit 14 senses that a predetermined pressure reduction has taken place in the filtrate outlet pipe 24 of the unit 14 concerned, which pressure reduction indicates that a second predetermined, higher degree of coating with particles has been reached on the filter surface, which means that the filter 18 has become saturated and too clogged, the associated filtrate pump 26 and inlet valve 30 are shut off, after which cleaning of the filter element 18 is commenced by the drum 16 being made to rotate, the scraping brush 38 scraping off the filter cake built up on the drum filter. The scraped-off particle sludge falls down and is collected on an underlying endless scraping conveyor 42 which transports the sludge out of the tank 10 via a sludge outlet 44 located above the liquid surface 46 in the tank 10. As mentioned above, cleaning of the drum filter 18 can also be effected by setting the drum 16 in rapid rotation by means of the motor 48 so that the particle accumulation built up is thrown off by the centrifugal force. In this case, no scraping brush is required. Cleaning of the filter element 18 can be completed with brief backwashing of the same by allowing filtrate in the outlet pipe 24 and the outlet line 28 to run back to and through the drum 16 with the inlet valve 30 open and the pump 26 and shut-off valve 36 shut off.

At the same time as cleaning of one or more filtering units 14 is initiated, the filtering unit(s) 14 kept inactive in a standby state is (are) activated. By means of this individual control and alternate functioning of the filtering units 14, it is possible to prevent the occurrence of a reduction in production of purified process liquid and thus to ensure a continuous supply of purified liquid to the consumer.

The invention claimed is:

1. A method for continuous filtering of particles from a contaminated liquid by means of two or more separate filtering units (14) in order continuously to feed purified liquid to a consumer, where each filtering unit (14) comprises a rotatable, perforated drum (16) with a particle-catching filter means (18) on the outer surface of the drum, which method comprises the steps of holding the filtering units (14) immersed in a tank (10) of liquid to be purified so that the latter can flow through the filter means and into the drum with the aid of hydrostatic pressure, particles to be separated becoming caught on the filter means and in a coating layer built up thereon by particles caught previously, and of purified liquid being fed from the drum (16) to the consumer by a respective pump (26) and an associated filtrate outlet (24, 28, 32), the method comprising: circulating liquid which has passed through the filter means (18) on the drum (16) back to the tank (10) until a first predetermined degree of coating with particles has been reached on the filter means of the drums; feeding purified liquid inside all except at least one of the drums (16) of the filtering units (14) to a consumer of purified liquid; keeping at least one filtering unit inactive in a standby state by shutting off the associated pump (26), interrupting the feed of purified liquid from a drum (16) to the consumer when a second predetermined, higher degree of coating with particles has been reached on the filter means on the drum, activating and maintaining at least one filtering unit (14) in a standby state as a replacement for the filtering unit or units from which the feed of purified liquid has been interrupted by means of its pump (26) being started up and its filtrate outlet (28, 32) being kept open, cleaning the filter means (18) of each shut down, filtering unit: passing liquid in the tank through the cleaned filter means on the drum of the shut-down filtering unit and circulating the liquid back to the tank (10) until the first predetermined degree of coating with particles has been reached on the filter means (18) of the drum, and shutting off the pump (26) of the cleaned shut-down filtering unit to put the filtering unit in a standby state.

2. A method according to claim 1, wherein the reaching of the first and second predetermined degree of coating with particles on the filter means on a drum (16) is detected by individual sensing of the pressure of the liquid on the downstream side of the filter means of each filtering unit (14).

3. A method according to claim 1, wherein the filter means (18) on the drum is cleaned by the drum (16) rapidly rotating the drum.

4. A method according to claim 1, wherein the filter means (18) on the drum (16) is cleaned by rotating the drum and urging a scraping device (38) against the drum to scrape off the particle coating on the drum.

5. A method according to claim 1, wherein the filter means (18) on the drum (16) is cleaned by backwashing the drum with purified liquid.

6. An apparatus for continuous filtering of particles from a contaminated liquid in a tank (10) in order continuously to feed purified liquid to a consumer, comprising two or more separate filtering units (14) which can be immersed completely in the liquid, wherein each filtering unit comprises a rotatable, perforated drum (16) with a particle-catching filter means (18) on the outer surface of the drum, an outlet (24) of the drum (16) for feeding purified liquid to the consumer, means for detecting when a predetermined high degree of coating with particles on the filter means (18) has been reached, and a device coordinated with each drum (16) for cleaning the filter means (18) on the drum when the predetermined high degree of coating with particles on the filter means has been reached, wherein the outlet of each drum has connected to a pump (26) for feeding purified liquid from the drum (16) to the consumers, a return line (34), equipped with a valve, to the tank (10), the pump for returning liquid from the drum (16) to the tank (10) while the predetermined low degree of coating with particles on the filter means (18) is built up before the pump (26) is driven only for feeding the purified liquid to the consumer, a pressure sensor (40) which individually senses the pressure of the liquid on the downstream side of the filter means (18) of each filtering unit (14) for detecting when the predetermined high degree of coating with particles on the filter means has been reached.

7. An apparatus according to claim 6, wherein at least one of the filtering units (14) may remain in a standby state while the other filtering units (14) work actively.

8. An apparatus according to claim 7, wherein the device for cleaning the filter means has a stripping means (38) that bears against the outside of the filter means (18) and scrapes off accumulated sludge thereon when the drum (16) rotates.

9. An apparatus according to claim 8, wherein a number of filtering units (14) are suspended in a common tank (10).

10. An apparatus according to claim 7, wherein the device for cleaning the filter means (18) includes a motor (46) to rotate the drum (16) rapidly.

11. An apparatus according to claim 10, wherein a number of filtering units (14) are suspended in a common tank (10).

12. An apparatus according to claim 7, wherein a number of filtering units (14) are suspended in a common tank (10).

13. An apparatus according to claim 6, wherein a number of filtering units (14) are suspended in a common tank (10).

* * * * *